(12) United States Patent
Al Sayeed et al.

(10) Patent No.: US 9,577,763 B2
(45) Date of Patent: Feb. 21, 2017

(54) SPECTRUM CONTROLLER SYSTEMS AND METHODS IN OPTICAL NETWORKS

(71) Applicant: Ciena Corporation, Hanover, MD (US)

(72) Inventors: Choudhury A. Al Sayeed, Gloucester (CA); David C. Bownass, Ottawa (CA); David W. Boertjes, Ottawa (CA); Shiyu Gao, Ottawa (CA)

(73) Assignee: Ciena Corporation, Hanover, MD (US)

( * ) Notice: Subject to any disclaimer, the term of this patent is extended or adjusted under 35 U.S.C. 154(b) by 195 days.

(21) Appl. No.: 14/693,202

(22) Filed: Apr. 22, 2015

(65) Prior Publication Data

US 2016/0315711 A1 Oct. 27, 2016

(51) Int. Cl.
| H04B 10/00 | (2013.01) |
| H04B 10/564 | (2013.01) |
| H04B 10/27 | (2013.01) |
| H04J 14/00 | (2006.01) |

(52) U.S. Cl.
CPC ............ H04B 10/564 (2013.01); H04B 10/27 (2013.01)

(58) Field of Classification Search
CPC ............ H04B 10/07955; H04B 10/293; H04B 10/2933; H04B 10/294; H04B 10/2935
See application file for complete search history.

(56) References Cited

U.S. PATENT DOCUMENTS

| 5,442,544 | A | 8/1995 | Jelinek |
| 7,826,748 | B2 | 11/2010 | Yang et al. |
| 7,873,274 | B2 | 1/2011 | Collings et al. |
| 7,983,560 | B2 | 7/2011 | Maki et al. |
| 8,095,008 | B2 | 1/2012 | Collings et al. |
| 8,135,280 | B2 | 3/2012 | Zong et al. |
| 8,160,446 | B2 | 4/2012 | Collings et al. |
| 2009/0116837 | A1 | 5/2009 | Boertjes et al. |
| 2010/0091355 | A1 | 4/2010 | Ota |
| 2010/0202777 | A1 | 8/2010 | Liu et al. |
| 2010/0221004 | A1 | 9/2010 | Haslam et al. |
| 2011/0176802 | A1 | 7/2011 | Callan |
| 2011/0200324 | A1 | 8/2011 | Boertjes et al. |

(Continued)

OTHER PUBLICATIONS

"PID Theory Explained," www.ni.com, published Mar. 29, 2011, pp. 1-4.

(Continued)

*Primary Examiner* — Daniel Dobson
(74) *Attorney, Agent, or Firm* — Clements Bernard Walker PLLC; Christopher L. Bernard; Lawrence A. Baratta, Jr.

(57) ABSTRACT

Spectrum control systems and methods are implemented to minimize power spectral density (PSD) offsets by adjusting gain of optical amplifiers in an optical section. The optical section is a logical boundary from one optical signal access point to a next adjacent optical signal access point. The systems and methods include estimating PSD offset from a given target for a peak channel at each span in the optical section, wherein the estimated PSD offset is divided at each span into two components including a self-introduced offset and an uncompensated offset from upstream; generating, for each span, a separate controller response for the self-introduced offset and the uncompensated offset from upstream; and controlling the gain of the optical amplifiers based on the separate controller response for the self-introduced offset and the uncompensated offset from upstream, for each span.

20 Claims, 8 Drawing Sheets

(56) References Cited

U.S. PATENT DOCUMENTS

| | | |
|---|---|---|
| 2011/0222846 A1 | 9/2011 | Boertjes et al. |
| 2011/0222851 A1 | 9/2011 | Berg |
| 2011/0222862 A1 | 9/2011 | Boertjes et al. |
| 2011/0268442 A1 | 11/2011 | Boertjes et al. |
| 2011/0274425 A1 | 11/2011 | Grobe |
| 2015/0117858 A1* | 4/2015 | Al Sayeed ....... H04B 10/07955 398/38 |

OTHER PUBLICATIONS

Aggarwal et al., "A Self-Tuning Analog Proportional-Integral-Derivative (PID) Controller," The Computer Society, IEEE, 2006, pp. 1-8.

* cited by examiner

SPECTRUM CONTROLLER SYSTEMS AND METHODS IN OPTICAL NETWORKS

FIELD OF THE DISCLOSURE

The present disclosure generally relates to optical networking systems and methods. More particularly, the present disclosure relates to spectrum controller systems and methods in optical networks for enhancing stability through distributed controlled optical spectrum, enabling such networks improvements in an ability to sustain optical line faults and capacity changes on the optical links.

BACKGROUND OF THE DISCLOSURE

With the introduction of high degree port count reconfigurable Wavelength Selective Switching (WSS) modules and other Reconfigurable Optical Add/Drop Multiplexing (ROADM) devices in mesh optical networks, and with the potential of high-mesh connectivity, control of optical networks is becoming very complex in terms of sequencing, messaging, and holding off control cycles for spectral stability between optically connected control domains. As new active optical line elements are introduced in a network, that are increasingly trying to control the same optical signals from upstream to downstream, stability of end-to-end optical signals is a primary concern. Conventionally, in optical networks, controllers are used to control the optical spectrum of various optical links in the optical network. Cascaded controllers are known to be unstable when operated independently without special treatment. To deal with such problems, conventional techniques use peer-to-peer messaging between neighboring sections or logical control domains that allow complete sequential operations from one control domain to the next, to ensure a stable system response.

However, there are multiple issues with peer-to-peer messaging. First, peer-to-peer messaging generate traffic overhead for control messaging. The peer-to-peer messaging framework works fine when there are a few dependent control domains. With the increase in the number of dependent control domains, especially in metro/mesh optical networks, and with the new high degree capable of ROADM architectures, the management of peer-to-peer messaging and sequencing actions between control domains, where each domain can have multi-degree upstream and downstream dependent domains, becomes very complex and unmanageable. Also, the peer-to-peer messaging does not scale in case of linear networks with long chains of cascaded control domains, where peer-to-peer messaging between two neighboring control domains fails to stop further downstream control domains that start to compensate for uncompensated upstream faults almost at the same time and generate spectrum instability.

Stability becomes an issue when peer-to-peer messaging fails to stop multiple control domains from reacting simultaneously due to capacity changes, fault handling, and performance optimization activities, collectively events in the optical network. When there are events, in a cascaded linear system, cascaded controllers can sequence operations to control optical spectrum at the same time in order to optimize launch powers and Optical Signal-to-Noise Ratio (OSNR) following the events. However, this can lead to oscillations or ringing in the optical spectrum, which in turn, can cause traffic hits. In a mesh optical network, or in a ring, where each optical section works on the same optical payloads as are in its upstream or downstream, the created oscillations over the spectrum, following events, can easily generate prolonged instability in the system.

Having independent sectional controllers or logical control domains that can control multiple actuators within a domain to maintain OSNR integrity over the optical spectrum following an event, such as an upstream fiber fault or span loss variations, remains a challenge, where if multiple downstream controllers start compensating for an upstream fault, it creates major instability over the optical spectrum. Again, conventional techniques of maintaining spectrum stability include either via peer-to-peer messaging between neighboring control domains and/or using arbitrary wait times in downstream control domains allowing upstream controller enough time to compensate for the fault or error. Other options may include designing subsequent controllers to update at the order of magnitudes slower than the upstream controllers. However, such conventional techniques are not scalable, especially in mesh optical networks, when each sectional controller may have to deal with multi-degree upstream and downstream dependent controllers, or in case of linear networks with long chain of cascaded control domains, where downstream controllers start to compensate for an uncompensated upstream fault after certain period. Hence, the challenge to achieve independent control domains with stable system response remains unresolved, which is primarily addressed herein.

The problem becomes more pronounced during a capacity change (add/delete) in network configurations in optical sections, where optical add/drop multiplexers (OADMs) are equipped with limited or no per channel actuator capabilities, and capacity change is mostly done either via upstream ROADMs equipped with Wavelength Selective Switches (WSSs) and/or by using transponder actuation capabilities. As it often happens with a capacity change, the spectral loading changes over the optical spectrum, it creates dynamic and static offsets on other in-service channels that almost linearly grows with the number of Erbium Doped Fiber Amplifiers (EDFAs) present in the line system. Although most of the EDFAs can compensate for the dynamic portion of the transient offsets using their fast gain controlled loops, it is the static offsets, that are mostly left over primarily due to spectral hole burning within the EDFAs and to some extents by Stimulated Raman Scattering (SRS), and amplifier tilt and ripple, and have to be dealt with upper layer of controllers such as sectional controller that typically operates in much slower extent (in seconds) by changing gain of the EDFAs to compensate offsets on in-service channels. And when multiple sectional controllers react simultaneously to a capacity change controlled from upstream, it generates instability in the system.

A typical example of such upstream controlled capacity change appears in flexible grid systems, specifically in a spectrally-tied super channel (also known as media channel) expansion/contraction scenario. In such case, in order to add new sub-carriers (also known as network media channels) into an already in-service super channel, the bandwidth of the super channel needs to be extended first on the flexible grid capable WSSs almost at the same attenuation level as the other in-service sub-carriers in order to avoid potential filter roll-off penalty for the new and existing sub-carriers. The allocation of the bandwidth and the expansion of the media channel should have to be done from ingress to egress in every ROADM sites before the addition of the new sub-carriers, which then have to be taken place using actuation capabilities available on the transponders. Such capacity additions or deletions over multiple OADM sections with long chain of amplifiers generate static power spectral density (PSD) offsets on other in-service channels, and without some sectional controllers that can not only just minimize PSD offsets autonomously, but also can maintain spectrum stability, the overall operation of media channel expansion/contraction in flexible-grid configuration is going to be complex and time consuming in terms of network-wide sequencing and messaging between all optically connected control domains.

Such challenges require autonomous and self-correcting controllers that can ensure the end-to-end stability of the optical spectrum, and yet handle capacity changes and faults with guaranteed optimal performance in a timely manner. With the evolving complexity of optical networks, it would be advantageous to move away from the sequential, peer-to-peer messaging-based approaches towards a non-peer-to-peer messaging-based, autonomous controller framework.

BRIEF SUMMARY OF THE DISCLOSURE

In an exemplary embodiment, a spectrum control method is described for minimizing power spectral density (PSD) offsets by adjusting gain of optical amplifiers in an optical section. The optical section includes a logical boundary from one optical signal access point to a next adjacent optical signal access point. The method includes estimating PSD offset from a given target for a peak channel at each span in the optical section, wherein the estimated PSD offset is divided at each span into two components including a self-introduced offset and an uncompensated offset from upstream; generating, for each span, a separate controller response for the self-introduced offset and the uncompensated offset from upstream; and controlling the gain of the optical amplifiers based on the separate controller response for the self-introduced offset and the uncompensated offset from upstream, for each span. The method can be performed in a controller for the optical section without peer-to-peer messaging with any other controllers from other optical sections, regardless of optical dependencies between the controller and the other controllers. The method can be implemented autonomously from other optical sections based on all PSD offsets at a first monitoring point in the optical section treated as uncompensated offset from upstream, thereby eliminating any need for messaging between controllers.

A first optical amplifier in the optical section can be assigned zero self-introduced offset, and can be configured to solely compensate the uncompensated offset from upstream using an adaptive controller that damps responses according to input power variations, thereby allowing upstream controllers an opportunity to correct the uncompensated offset from upstream. The spectrum control method can be implemented in a spectrum controller that operates a plurality of Automatic Gain Controlled (AGC) controllers for each optical amplifier in the optical section, wherein each of the AGC controllers knows the estimated PSD offset and dynamic range of an immediate upstream AGC controller in the optical section. A first AGC in the optical section of the plurality of AGCs can treat all PSD offsets as coming from upstream. The separate controller can generate a proportionate response to compensate for the self-introduced offset, and an adaptive proportionate response to compensate for the uncompensated offset from upstream that is dynamically readjusted based on unexpected output power variations. For all optical amplifiers except a first optical amplifier in the optical section, the separate controller does not compensate for the uncompensated offset from upstream as long as an immediate upstream optical amplifier in the optical section has enough dynamic range to compensate for the uncompensated offset from upstream.

The PSD offset can be estimated for each span through one or more monitoring points in the optical section. The PSD offset is a difference between an estimated channel power for a peak channel and a target launch power for the peak channel, and each optical amplifier in the optical section has an associated PSD offset. For all optical amplifiers except a first optical amplifier in the optical section, the magnitude of the power spectral density offset for which, each controller compensates, can be one of an estimated channel power for a peak channel minus a target launch power for the peak channel minus the PSD offset from the first optical amplifier if the first optical amplifier has dynamic range left, or an estimated channel power for a peak channel minus a target launch power for the peak channel if the first optical amplifier does not have dynamic range left. For an optical amplifier that is not a first optical amplifier in the optical section, the two components can be determined by, if a previous optical amplifier has available dynamic range or overshooting, the uncompensated offset from upstream is set to zero and the self-introduced offset is a difference of the PSD offset from the optical amplifier and the PSD offset from the previous optical amplifier, or else, the uncompensated offset from upstream is set to the estimated PSD offset and the self-introduced offset is set to zero.

In another exemplary embodiment, a controller is described configured to minimize power spectral density (PSD) offsets through gain adjustments in optical amplifiers in an optical section. The optical section includes a logical boundary from one optical signal access point to a next adjacent optical signal access point. The controller includes an interface communicatively coupled to elements in the optical section, the interface configured to receive measurements from the elements; a processor communicatively coupled to the interface; and memory storing instructions that, when executed, cause the processor to estimate PSD offset from a given target for a peak channel at each span in the optical section based on the measurements, wherein the estimated PSD offset is divided at each span into two components including a self-introduced offset and an uncompensated offset from upstream, generate, for each span, a separate controller response for the self-introduced offset and the uncompensated offset from upstream, and control the gain of the optical amplifiers based on the separate controller response for the self-introduced offset and the uncompensated offset from upstream, for each span. The controller does not perform peer-to-peer messaging with any other controllers from other optical sections in operation, regardless of optical dependencies between the controller and the other controllers. The controller can operate autonomously from other optical sections based on all estimated PSD offsets at a first monitoring point in the optical section is uncompensated offset from upstream, thereby eliminating any need for messaging between controllers.

A first optical amplifier in the optical section can be assigned zero self-introduced offset, and is configured to solely compensate the uncompensated offset from upstream using an adaptive controller that damps responses according to input power variations, thereby allowing upstream controllers an opportunity to correct the uncompensated offset from upstream. The controller can be a spectrum controller that operates a plurality of Automatic Gain Controlled (AGC) controllers for each optical amplifier in the optical section, wherein each of the AGC controllers knows the estimated PSD offset and dynamic range of an immediate upstream AGC controller in the optical section. The separate controller can generate a proportionate response to compensate for the self-introduced offset, and an adaptive proportionate response to compensate for the uncompensated offset from upstream that is dynamically readjusted based on unexpected output variations. For all optical amplifiers except a first optical amplifier in the optical section, the separate controller does not compensate for the uncompensated offset from upstream as long as an immediate upstream optical amplifier in the optical section has enough dynamic range to compensate for the uncompensated offset from upstream.

In a further exemplary embodiment, an optical network includes N optical sections each including a logical boundary from one optical signal access point to a next adjacent optical signal access point, N is an integer greater than 1; one or more optical amplifiers in each of the N optical sections; and N sectional controllers configured to minimize power spectral density (PSD) offsets based on controlling gain of the one or more optical amplifiers in an associated optical section; wherein the N sectional controllers are configured to minimize the PSD offsets without peer-to-peer messaging between one another based on all PSD offsets at a first monitoring point in the associated optical section treated as upstream PSD offsets, and an associated response to the upstream PSD offsets is dampened to allow upstream sectional controllers an opportunity to control.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, spectral controller systems and methods are described for enhancing stability in optical networks with distributed controlled optical spectrum. The systems and methods focus on a framework for autonomous, stable optical sectional controllers. The systems and methods propose an independent spectrum controller, which can be referred to as a Spectral Power Offset Eliminator (SPOE), which can eliminate power spectral density (PSD) offsets on in-service channels accumulated over the gain controlled line elements over a capacity change, or can recover the spectrum from line fiber pinches or span loss variations. The spectrum controller operates per optical section (which can be defined between OADM or ROADM nodes), and controls at least one or more gain controlled line elements or optical amplifiers (amps) per section. As described herein, a spectrum controller is a subset of a sectional controller that focuses on controlling Automatic Gain Controlled (AGC) optical amplifiers or the like.

The spectrum controller ensures spectrum stability, between a chain or mesh of optical sections, by allowing each spectrum controller the ability to identify the optimal amount of error, for which it should compensate, without fighting any upstream or downstream dependent controllers, and without messaging between neighboring optical sections or control domains. This ability to identify the optimal amount of error, for which it should compensate is by assuming any error or perturbation detected, at a first monitoring point in the current optical section or control domain, is due to upstream optical sections or control domains. Thus, the spectrum controller for the current optical section or control domain only seeks to compensate for errors or perturbations detect in the current optical section or control domain. Thus, with the systems and methods described herein, sectional controllers can operate independently, in a message free environment, allowing the possibility of developing independent OADM sectional controllers. The spectrum controllers allow sectional controllers to be autonomous enough in future flexible grid deployments to detect new sub-carrier additions/deletions within an in-service super-channel, and independently minimize PSD offsets as necessary.

Figure 1:
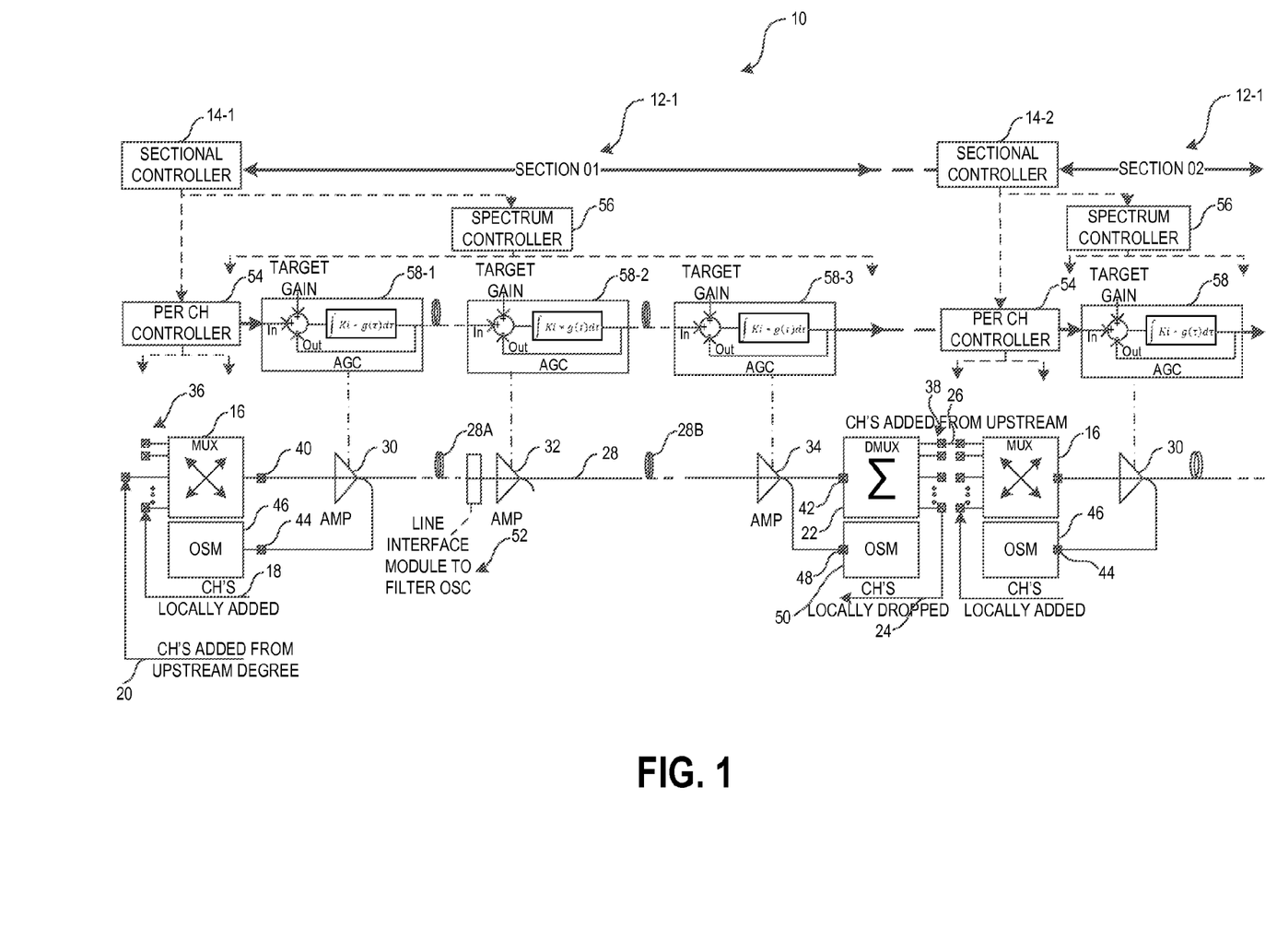
FIG. 1 is a network diagram of an optical network, using a distributed controlled architecture, with two exemplary optical sections.

Referring to FIG. 1, in an exemplary embodiment, a network diagram illustrates an optical network 10, using a distributed controlled architecture, with two exemplary optical sections 12-1, 12-2. In the distributed controlled architecture, sectional controllers 14-1, 14-2, required to control the optical elements, can be segmented per sections, where an optical section 12-1, 12-2 refers to a logical boundary from one channel access point (add/drop) until the next, i.e., between terminals, OADMs, ROADMs, etc. This definition of the optical section 12-1, 12-2 is advantageous in that the channel loading is constant throughout the entire section, i.e., since there are no channel access points except at the beginning and end of the optical section 12-1, 12-2, the channel loading is the same through the optical section 12-1, 12-2. It is within this framework that the systems and methods describe a manner for the sectional controllers 14-1, 14-2 to operate autonomously and independently from one another, without peer-to-peer messaging between them. Specifically, the sectional controller 14-1 operates over the section 12-1, the sectional controller 14-2 operates over the section 12-2, etc.

The optical network 10 shows a typical view of the optical sections 12-1, 12-2. For illustration purposes, a portion of the optical section 12-2 is shown, and a single direction in the optical section 12-1 is shown. Of course, the optical network 10 can include two directions for bi-directional communication and various other optical sections 12. The optical section 12-1 includes, at one end, a multiplexer 16 where channels are locally added 18 or added from upstream degrees 20 and, at another end, a demultiplexer 22 where channels are locally dropped 24 or added upstream 26. The channel access points (add/drop) can be referred to as degrees—each degree is a point in the optical network 10 where channels can be locally added or dropped or added from other degrees. In the example of FIG. 1, the multiplexer 16 is a degree for adding channels and the demultiplexer 22 is a degree for dropping channels. For illustration purposes, the optical network 10 does not illustrate equipment for adding/dropping channels such as transmitters, receivers, transceivers, optical modems, etc.

There is an optical link 28 between the multiplexer 16 and the demultiplexer 22, such as an optical fiber. The optical link 28 can be any distance from several kilometers to hundreds or thousands of kilometers. As such, the optical link 28 includes optical amplifiers 30, 32, 34 to amplify the optical spectrum on the optical link 28. The optical amplifiers 30, 32, 34 can be Erbium Doped Fiber Amplifiers (EDFA), Raman amplifiers, or the like, which are Automatic Gain Controlled (AGC). In this example, the optical amplifier 30 is a post-amplifier after the multiplexer 16, the optical amplifier 32 is a line amplifier, and the optical amplifier 34 is a pre-amplifier before the demultiplexer 22. Note, there can be multiple line amplifiers, depending on the overall distance of the optical link 28. There are various monitoring points before, along, and after the optical section 12-1 where the optical spectrum or its total power can be monitored. There are monitoring points 36, 38 where the total power of the optical spectrum may be monitored, internally to a node, i.e., the monitoring points 36 can be on or before the multiplexer 16 and the monitoring point 38 can be on or after the demultiplexer 22. There are monitoring points 40, 42, where the optical spectrum or its total power may be monitored after the multiplexer (the monitoring point 40) and before the demultiplexer (the monitoring point 42). There is a monitoring point 44 where the optical spectrum may be monitored after the optical amplifier 30, with an Optical Spectrum Monitor (OSM) 46. There is a monitoring point 48 where the optical spectrum may be monitored after the optical amplifier 34, with an OSM 50. Finally, the optical amplifier 32 and other line amplifiers can include monitoring points 52, such as via Optical Service Channel (OSC) ports or the like, which can also include OSMs 46, 50 at the optical amplifier 32. The optical section 12-2 and other optical sections can have similar monitoring points. Note that using the spectrum monitoring from the OSMs and the total power readings from other monitoring points, it is possible to estimate the optical spectrum at different locations of an optical section by proper modeling of the photonic line components.

With respect to controlling the optical spectrum, the multiplexer 16 can include per channel actuators at the monitoring points 36 and the demultiplexer 22 can include per channel actuators at the monitoring points 38. For example, the per channel actuators may include Wavelength Selective Switch (WSS) pixels, Variable Optical Attenuators (VOAs), etc. The WSSs may be able to control optical spectrum on a small granularity, such as 6.25 GHz windows or higher. As illustrated, a typical optical section 12-1, 12-2 can start with a channel or optical signal access point equipped with per channel actuators and OSMs 46, 50, followed by Automatic Gain Controlled (AGCs) optical amplifiers (AMPs) 30, 32, 34.

The sectional controller 14-1, 14-2, which may run at the optical section 12 head, can have two unique types of sub-controllers: (1) a per channel controller 54 that can adjust per channel actuators to achieve a target launch profile at the optical section 12 head, and (2) a spectrum controller 54 that can essentially adjust the gain of each optical amplifier 30, 32, 34 to achieve required launch power per span in order to avoid non-linearity and to deliver optimal Signal-to-Noise Ratio (SNR) over the optical spectrum.

In various exemplary embodiments, the sectional controller 14-1, 14-2, with the per channel controller 54 and the spectrum controller 54, provide a non-messaging-based, autonomous controller framework. There are two aspects of this autonomous controller framework—the per channel controllers 54 and the spectrum controllers 54. The per channel controllers 54 operate between multiple sections 12 independent of each other, and yet can generate stable response per channel. The spectrum controller 54 includes multiple AGC controllers 58, one for each of the optical amplifiers 30, 32, 34, which are AGC elements, per optical section 12. Note, the AGC controllers 58 can be performed together, through the spectrum controller 56, but the spectrum controller 56 and the associated AGC controllers 57 operate independent of any communication between other optical sections 12, and yet maintain the stability and hence, in turn, the OSNR integrity over the optical spectrum.

The per channel controller 54 is described, in part, in commonly-assigned U.S. patent application Ser. No. 13/655,567 A1 entitled "SYSTEMS AND METHODS FOR CHANNEL ADDITIONS OVER MULTIPLE CASCADED OPTICAL NODES" and filed on Oct. 19, 2012, the contents of which are incorporated by reference herein. U.S. patent application Ser. No. 13/655,567 describes stability between multiple nodes operating simultaneously and independently to generate stable response for a single channel, where every node specifically deals with a single per channel controller (or a single actuator).

The systems and methods described herein relate to deriving an independent, "message-free" spectrum controller framework that can not only maintain stability between multiple AGC controllers 58 within an optical section 12, but also is capable of maintaining stability for all channels in the optical spectrum without any peer-to-peer messaging between its dependent upstream or downstream sections 12 or without any per channel actuation capabilities. Specifically, the systems and methods described herein describe how to eliminate PSD offsets for the in-service channels from their defined optimal launch power targets in individual spans within an optical section 12. Hence, the focus of the systems and methods described herein is the spectrum controller 54 to control all channels for a given spectrum without any per channel actuation capabilities, whereas the focus of U.S. patent application Ser. No. 13/655,567 was on the per channel controllers 54.

The spectrum controllers 54 solve the instability issue over the optical spectrum when multiple sectional controllers 14 or logical groups of controllers within the optical network 10 try to compensate for the same fault without any peer-to-peer messaging between them. This allows designing autonomous spectrum controllers 54 for each optical section 12 that will make the optical network 10 more scalable and robust for high-degree mesh optical networks, and for future flexible-grid deployments. Note, flexible-grid deployments are now defined in ITU Recommendation G.694.1 "Spectral grids for WDM applications: DWDM frequency grid" (02/12), the contents of which are incorporated by reference herein. Specifically, in addition to the fixed spacing Dense Wavelength Division Multiplexing (DWDM) grids, a newer flexible DWDM grid has been introduced to allow a mixed bit rate or mixed modulation format transmission system to allocate frequency slots with different widths so that they can be optimized for the bandwidth requirements of the particular bit rate and modulation scheme of the individual channels. In flexible-grid deployments, in a super-channel expansion/contraction scenario, the systems and methods describe herein allow the sectional controllers 14 a unique way to minimize PSD offsets on in-service channels in an autonomous and timely fashion, while sub-carriers' additions/deletions can be controlled using transponder actuation capabilities.

The systems and methods also provide unique way of managing stability between controllers within an optical section 12, where the sectional controller 14 facilitates each sub-controller within the optical section 12 the ability to isolate error contents introduced on or before them regardless of their hardware limitations, spectral fill and optical dependency with upstream controllers. The proposed systems and methods are key to develop scalable optical controller solutions for DWDM line products. The systems and methods allow domain/sectional controllers 14 to be robust, and to operate in an independent, peer-to-peer messaging free environment that will substantially reduce current set of overheads, system instability, and optimization delays, and make sectional controllers 14 more scalable to large-scale mesh networks. The systems and methods are also key to allowing parallel domain SNR optimization during flexible grid media channel expansion/contraction scenarios, specifically in terrestrial deployments.

In an exemplary embodiment, a process allows the sectional controller 14-1 to ensure the optical spectrum is achieving a target launch power per channel or a target launch power spectral density per fiber span 28A, 28B (between each optical amplifier 30, 32, 34 on the optical link 28). The process includes estimating a spectral shape and steady-state power offset from a given target for a peak channel (i.e., a channel with a peak power spectral density at each fiber span 28A, 28B), where optical spectrum per span can be estimated or measured using the OSMs 46, 50 and/or by modeling the physical characteristics of the optical link 28 and the optical amplifiers 30, 32, 34. The process further includes dividing the estimated steady-state power offset at each optical amplifier 30, 32, 34 into two distinct categories or components: a self-introduced offset and an uncompensated offset from upstream, and generating controller response accordingly. Finally, the process includes controlling steady-state gain on at least one or more of the optical amplifiers 30, 32, 34 within the section without any communication with upstream or downstream section controllers 14-2 regardless of any optical dependency between the controllers 14-1, 14-2. The process allows two or more sectional controllers 14-1, 14-2 to eliminate PSD offsets for peak channel or peak power spectral density from a given launch power target without any communication with upstream or downstream sectional controllers 14-1, 14-2 regardless of their optical dependency, and per channel actuation capabilities.

The process ensures stability between multiple controllers 14, 56, 58 or optical line elements (i.e., the optical amplifiers 30, 32, 34) within a logical group or section boundary, i.e. the optical section 12. The error component is estimated or measured at each AGC controller 58, and is divided into two distinct categories or components: an error component introduced on or just before that controller 58, and an uncompensated error component from upstream controllers; with the assumption that the first AGC controller 58-1 or optical amplifier 30 in each logical group or section boundary introduces a negligible amount of error, and the measured or estimated error component on the first AGC controller 58-1 is all coming from upstream logical group or section 12. Each AGC controller 58 knows the error component and dynamic control range of immediate upstream AGC controller 58 within the logical boundary (i.e., optical section 12), and generates a proportionate response to compensate for the self-introduced error components, and an adaptive proportionate response to compensate for the uncompensated error component from upstream that is dynamically readjusted based on unexpected output variations.

In the process, a controller 58 can decide not to compensate for a cumulative error component from upstream as long as the immediate upstream controller 58 within the same logical boundary or section 12 has enough dynamic range to compensate for incurred error, or can decide to compensate a portion of the upstream error component that cannot be compensated by the available upstream controller dynamic range. The controller 58 compensates for the cumulative error component using an adaptive controller if the immediate upstream controller 58 within the same logical boundary or section 12 has no dynamic range left.

Figure 2:
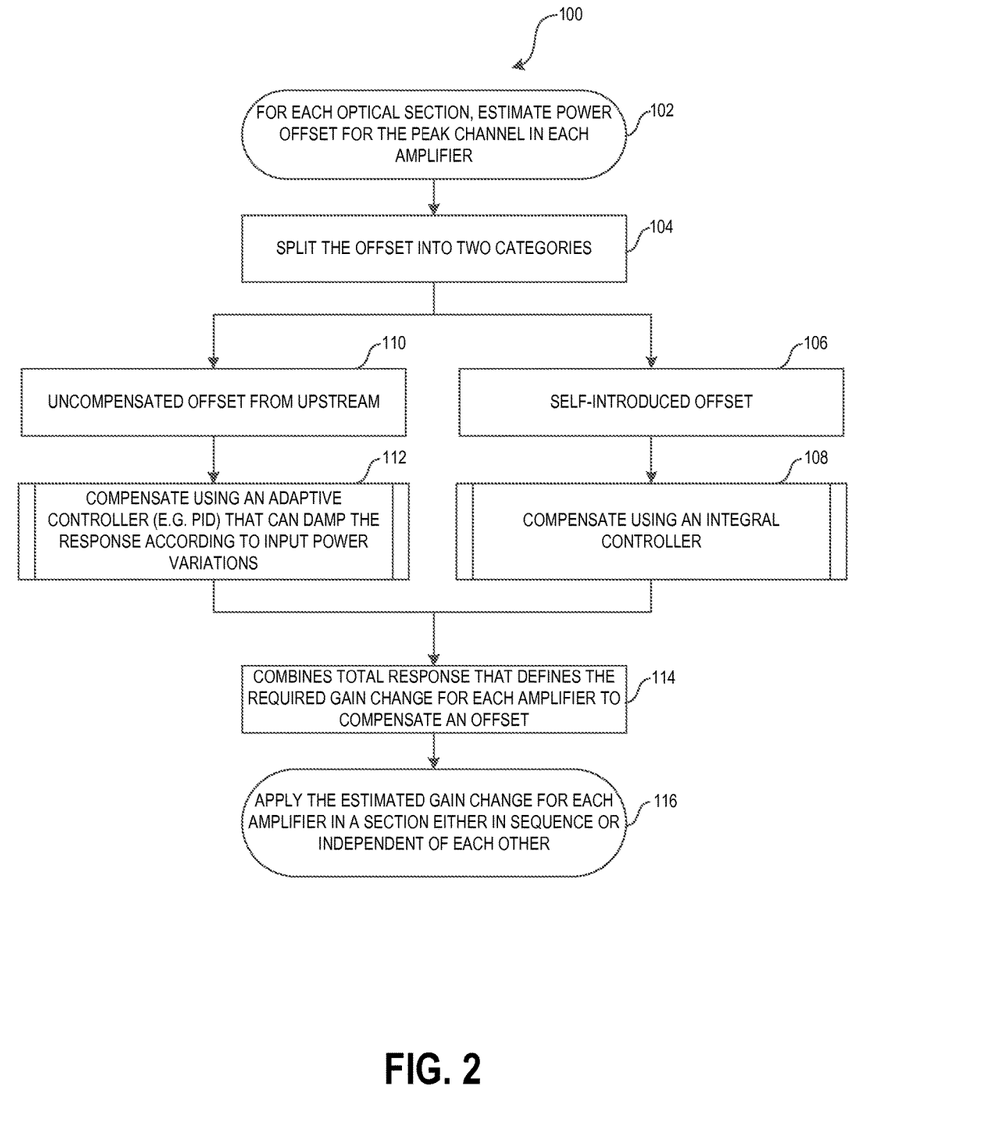
FIG. 2 is a flowchart of a power spectral density offset elimination process, which can be implemented in the sectional controllers for each optical section in the optical network of FIG. 1.

Referring to FIG. 2, in an exemplary embodiment, a flowchart illustrates an SPOE process 100, which can be implemented in the sectional controllers 14 for each optical section 12 in the optical network 10. The SPOE process 100 describes the core functional aspects of the sectional controllers 14, acting as Spectral Power Offset Eliminators (SPOEs). Again, the sectional controllers 14 and the SPOE process 100 operate per optical section 12 to control at least one or more AGC line elements or optical amplifiers 30, 32, 34 per optical section 12.

For each optical amplifier 30, 32, 34, the SPOE process 100 includes estimating the spectral shape and steady-state power offset value for the peak in-service channel in the spectrum from its target launch power into the optical link 28 (step 102), and generating a proportional gain response accordingly to compensate by splitting the offset into two categories or components (step 104): (1) a self-introduced offset (step 106), for which the SPOE process 100 includes generating a response using an integral controller (step 108), and (2) an uncompensated offset from upstream (step 110), for which the SPOE process 100 includes using an adaptive Proportional-Integral-Derivative (PID) controller that can dynamically damp the response according to input power variations. Note, the uncompensated offset is detected at a first monitoring point in the optical section 12, over which the SPOE process 100 is operating. The SPOE process 100 can include estimating the spectrum shape based on the feedback received from the OSMs 46, 50 and the other monitoring points in the optical system 10, and/or can model the optical link 28 (i.e., the fiber plant) to estimate the shape at the output of each optical amplifier 30, 32, 34.

The SPOE process 100 includes combining a total response from outputs of the steps 108, 112 to define a required gain change for each optical amplifier, i.e., a new gain response, to compensate for the offset (step 114). Once the new gain response is generated, the SPOE process 100 can include setting new target gains to all amplifiers within a section simultaneously, or can facilitate each amplifier with necessary info so that each amplifier controller can set its gain accordingly (step 116). Note, a key aspect in enabling the sectional controllers 14 to operate the SPOE process 100 in without messaging other controllers 14 is based on step 104 where the offset is split into two categories or components. In this manner, the SPOE process 100 includes actively compensating for the self-induced offset, i.e., the offset generated in the optical section 12 where the SPOE process 100 is operating and providing a damped response to any upstream uncompensated offset. The response is damped for the upstream uncompensated offset because it is assumed that other sectional controllers 14 are working on compensating this offset themselves, using their one implementation of the SPOE process 100. However, the SPOE process 100 does contemplate compensating the upstream uncompensated offset, albeit on a much slower timescale and with a damped response, allowing local sectional controllers 14 an opportunity to compensate.

There are multiple applications spaces in optical networks 10, where offsets are generated on in-service channels. An offset, or power spectral density offset, is designated as a delta of the launch power of the peak in-service channel in the optical spectrum from its target launch power, into the optical link 28. EDFAs can introduce steady-state offsets on in-service channels during capacity change, i.e., after adding or deleting channels in the optical spectrum. Offsets can also be introduced due to pinches in intra- or inter-node fibers, and span loss variations. The SPOE process 100 can be run by the sectional controller 14 when such offset in any optical amplifier 30, 32, 34 becomes greater than a certain threshold that can potentially compromise the available OSNR margin.

Figure 3:
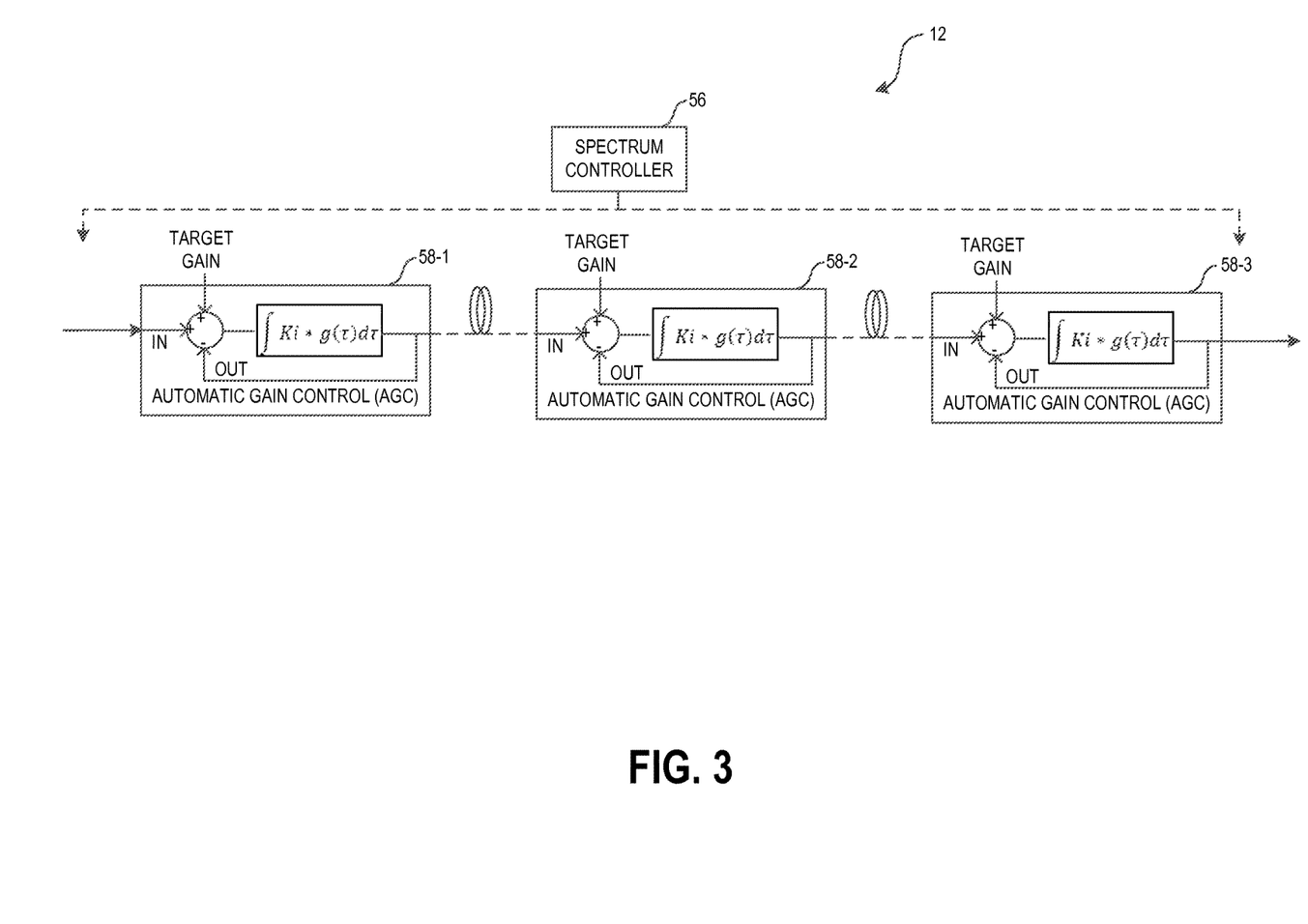
FIG. 3 is a block diagram of a close-up view of the spectrum controller and associated Automatic Gain Controlled (AGC) elements under control, from the optical section in the optical network of FIG. 1.

Referring to FIG. 3, in an exemplary embodiment, a block diagram illustrates a close-up view of the spectrum controller 56 and AGC controllers 58-1, 58-2, 58-3 under control. In the exemplary optical network 10, the AGC controller 58-1 controls the optical amplifier 30, the AGC controller 58-2 controls the optical amplifier 32, and the AGC 58-3 controller controls the optical amplifier 34. The AGC controllers 58 each include an integral controller to control the target gain of their associated optical amplifier 30, 32, 34 under control. One of the key challenges for the spectrum controller 56 and the SPOE process 100 is to maintain the spectrum stability over multiple AGC controllers 58 within the optical section 12 while adjusting their gains for compensating offsets.

Figure 4:
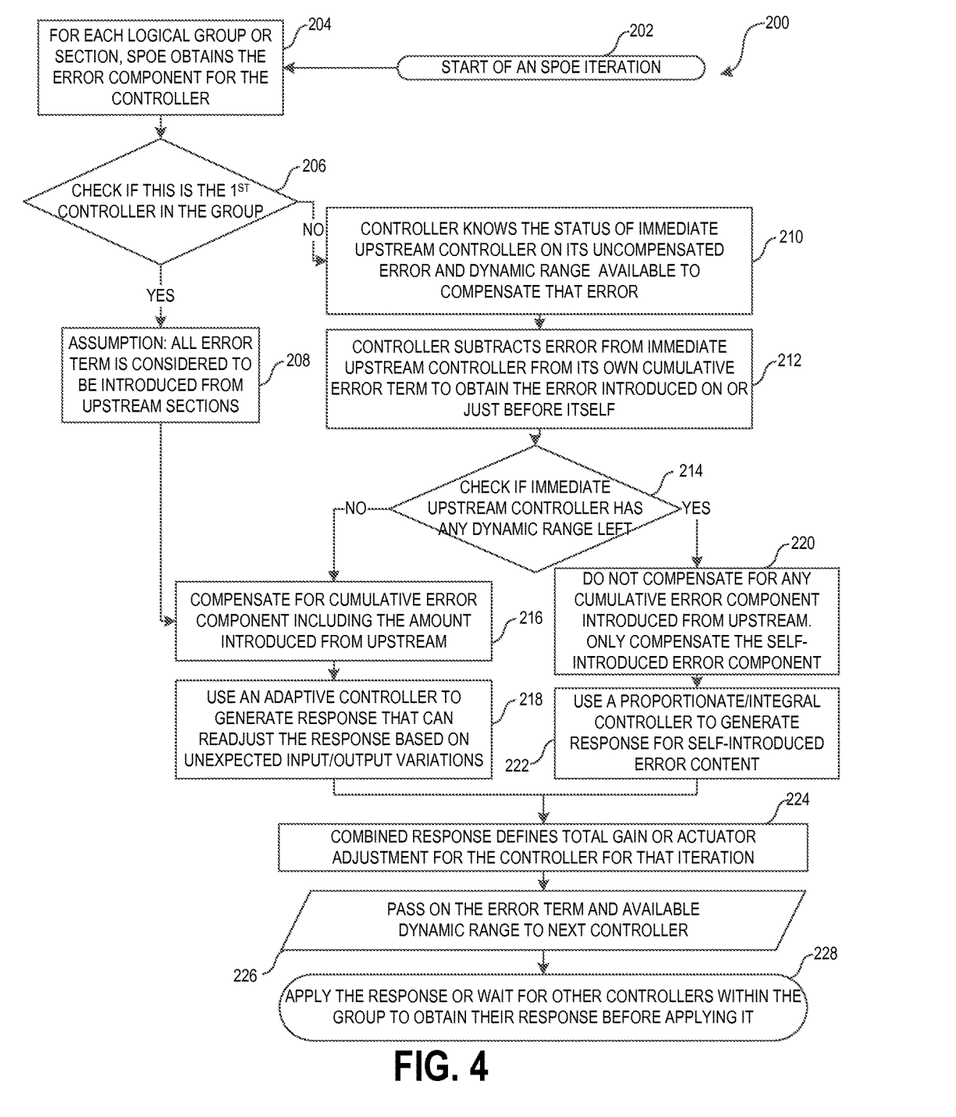
FIG. 4 is a flowchart of a controller stability which describes how the spectrum controller maintains stability between the AGC elements in an optical section.

Referring to FIG. 4, in an exemplary embodiment, a flowchart of a controller stability process 200 which describes how the spectrum controller 56 maintains stability between the AGC controllers 58 in an optical section 12. Specifically, the controller stability process 200 is implemented at or for each of the AGC controller 58. The foregoing descriptions of the controller stability process 200 can be implemented by any of the AGC controller 58.

The controller stability process 200 includes starting an SPOE iteration (step 202), and, for each optical section 12 or logical group, obtaining an error component for the AGC controller 58 associated with this iteration (step 204). Specifically, the controller stability process 200 includes, for each AGC optical amplifier with the optical section 12, estimating the offsets or error components based on power spectrums measured or estimated using the optical spectrum monitors or the like. The steps in the controller stability process 200 are different depending on whether the AGC controller 58 associated with this iteration is the first AGC controller 58 in the group or not (step 206). Since for a capacity change actions (channels add/delete) with limited power change per iterations, the steady state offsets introduced on in-service channel from a single optical amplifier is relatively small (other than the ripples), and the chances of getting any dynamic fiber fault or loss variations for any intra-node fiber is very low, the controller stability process 200 includes the assumption that for the first optical amplifier in the optical section 12 the self-introduced offset content is minimal or zero and any power offset visible for the peak in-service channel is coming from perturbations in upstream sections (step 208).

For all other AGC controller 58 in the section 12 (step 206), these controllers 58 knows the status of immediate upstream controllers on its uncompensated error and dynamic range available to compensate that error (step 210). This is because the other AGC controller 58 are interacting through the spectrum controller 56 and are aware of the uncompensated error from upstream controllers 58 that are also under the control of the spectrum controller 56. Next, the controller 58 subtracts the error from the upstream controllers 58 from its own cumulative error term to obtain the error introduced on or just before the AGC element associated with this controller 58 (step 212). At this point, the AGC controller 58 knows the amount of offset error due to itself and due to upstream AGC elements. Since the error term estimated for the upstream controller 58 represents the cumulative error contents introduced by all the other controllers 58 upstream, each controller 58 can subtract the error from immediate upstream controller 58 from its cumulative error term to obtain the self-introduced error content.

The steps in the controller stability process 200 are different depending on whether the immediate AGC controller 58 has any dynamic range left (step 214). If the immediate AGC controller 58 does not have any dynamic range left (step 214) and after step 208, the controller stability process 200 includes compensating for a cumulative error component including an amount of error introduced from upstream (step 216) by, for example, using an adaptive controller to generate a response that can readjust based on unexpected input/output variations (step 218). Here, the adaptive controller 58 can compensate for the offsets seen in the first optical amplifier 30 that can be carefully designed to generate smaller responses at initial iterations, and then gradually growing the response amount to compensate the remaining error terms. The controller 58 can also be designed so that it can readjust an estimated response for the next iteration based on unexpected output variations in the past iterations. This is the damped response described above.

If the immediate controller 58 does have dynamic range left (step 214), the immediate controller 58 does not compensate for any cumulative error component introduced from upstream; rather, the immediate controller 58 only compensates for the self-introduced error component (step 220) using, for example, a proportional/integral controller to generate a response for the self-introduced error component (step 222). The controller stability process 200 follows two unique steps for AGC controllers 58: (1) identify the amount of offsets or errors being introduced by the controller 58 itself due to either gain-balancing of the optical amplifiers 30, 32, 34 over the optical spectrum following a capacity change or due to fiber loss variations on or before that optical amplifier 30, 32, 34, and (2) to compensate only the self-introduced offset contents and not to compensate for any upstream error terms as long as upstream controllers 58 has some dynamic range left. If the AGC controller 58 is the first in the optical section 12 or has no remaining dynamic range, the controller stability process 200 can compensate for the cumulative error component as well used an adaptive controller.

If the immediate upstream controller 58 runs out of dynamic range, then the next controller 58 can pick it up by compensating for the cumulative error contents using adaptive controllers similar to the one used by the first optical amplifier rather than compensating only for the self-introduced error contents. In this way, within an optical section 12, these processes ensure only one controller with available dynamic range remains responsible for compensating a fault without fighting with others and hence ensures stability over the sensitive optical spectrum. After steps 218, 222, the controller stability process 200 includes a combined response that defines total gain or actuator adjustments for the AGC controller 58 for this iteration (step 224) and the error term and available dynamic range for the AGC controller 58 can be passed to the next AGC controller 58, associated with the spectrum controller 56 (step 226). Finally, the response can be applied or delayed until other controllers 58 within the group (associated with the same spectrum controller 56) obtain their responses (step 228).

Figure 5:
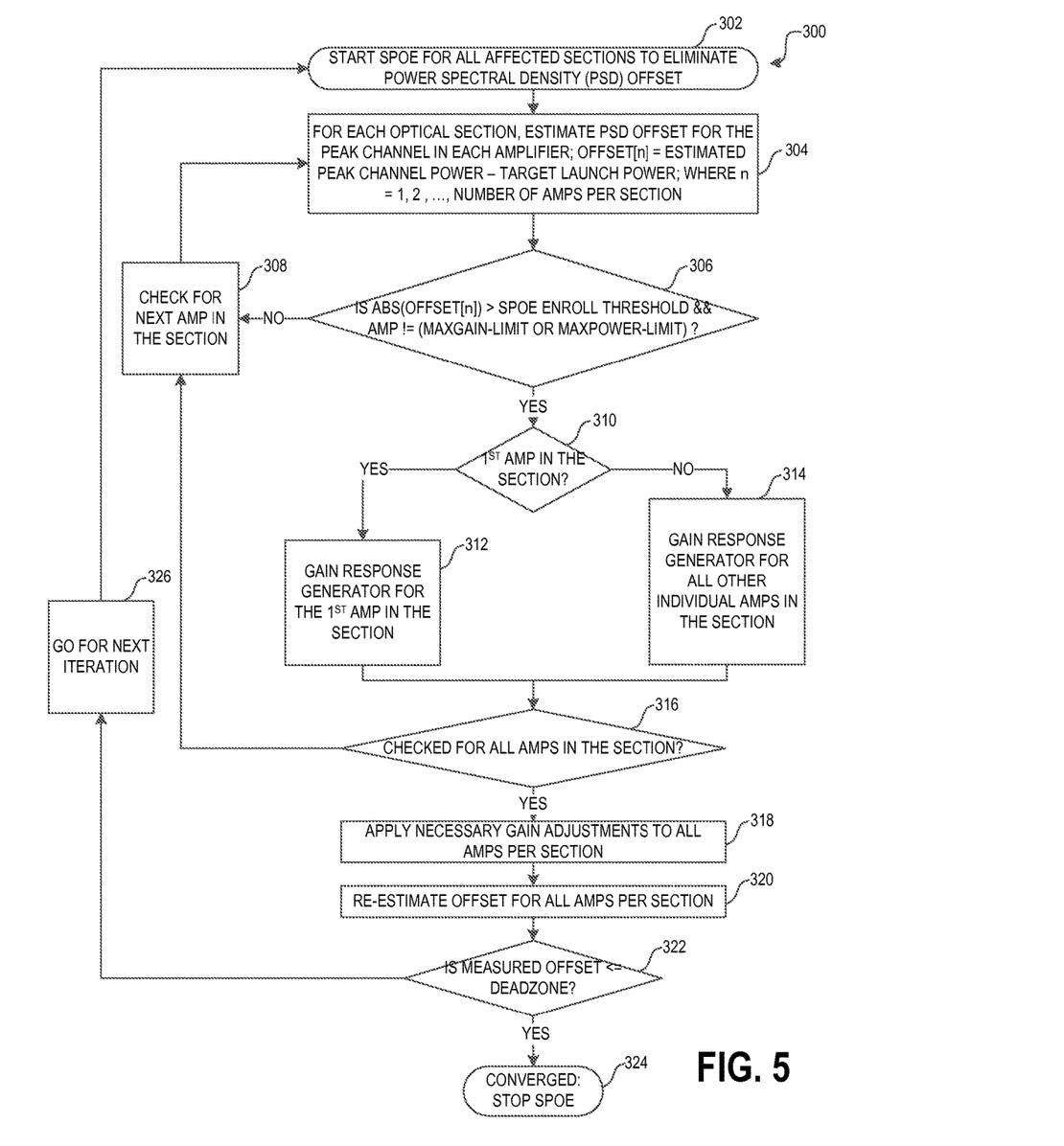
FIG. 5 is a flowchart of a Spectral Power Offset Eliminator (SPOE) process implemented by the spectrum controller for each optical section.

Referring to FIG. 5, in an exemplary embodiment, a flowchart illustrates an SPOE process 300 implemented by the spectrum controller 56 for each optical section 12. The SPOE process 300 is started for all affected optical sections 12 to eliminate power spectral density offset (step 302). For each optical section 12, the SPOE process 300 includes estimating power offset for the peak channel in each optical amplifier 30, 32, 34; this is done as follows:

$$\text{Offset}[n] = \text{Estimated Peak Channel Power} - \text{Target launch power}$$

where n=1, 2, . . . , is the number of optical amplifiers 30, 32, 34 per optical section 12 (step 304).

For each offset[n], it is determined whether the absolute value of offset[n] (ABS(offset[n])) is greater than an SPOE enroll threshold and (&&) the optical amplifier is not at its maximum gain limit or its maximum power limit (step 306). If not (step 308), the SPOE process 300 checks for the next optical amplifier 30, 32, 34 in the optical section 12 (step 308). If so (step 308), the SPOE process 300 checks whether this optical amplifier is the first optical amplifier (e.g., the optical amplifier 30) in the optical section 12 (step 310). If so (step 310), the SPOE process 300 includes implementing a gain response generator for the first optical amplifier in the optical section 12 (step 312). If not (step 310), the SPOE process 300 includes implementing a gain response generator for all other individual optical amplifiers in the optical section (step 314). That is, the SPOE process 300 implements a specific gain response for each optical amplifier 30, 32, 34 based on their optical connectivity in the optical section 12 (step 316), applies all necessary gain adjustments to all optical amplifiers 30, 32, 34 in the optical section 12 (step 318), and re-estimates offsets in each optical amplifier to confirm the effect has been minimized (step 320). If the re-estimated/measured offset is less than or equal to a dead zone (step 322), the SPOE process 300 has converged and stopped (step 324). Otherwise (step 322), the SPOE process 300 can perform another iteration (step 326). Note, while the SPOE process 300 can be implemented in different optical sections 12, by associated spectrum controllers 56, each implementation of the SPOE process 300 per optical section 12 is independent, without coordination or messaging with other optical sections 12.

Figure 6:
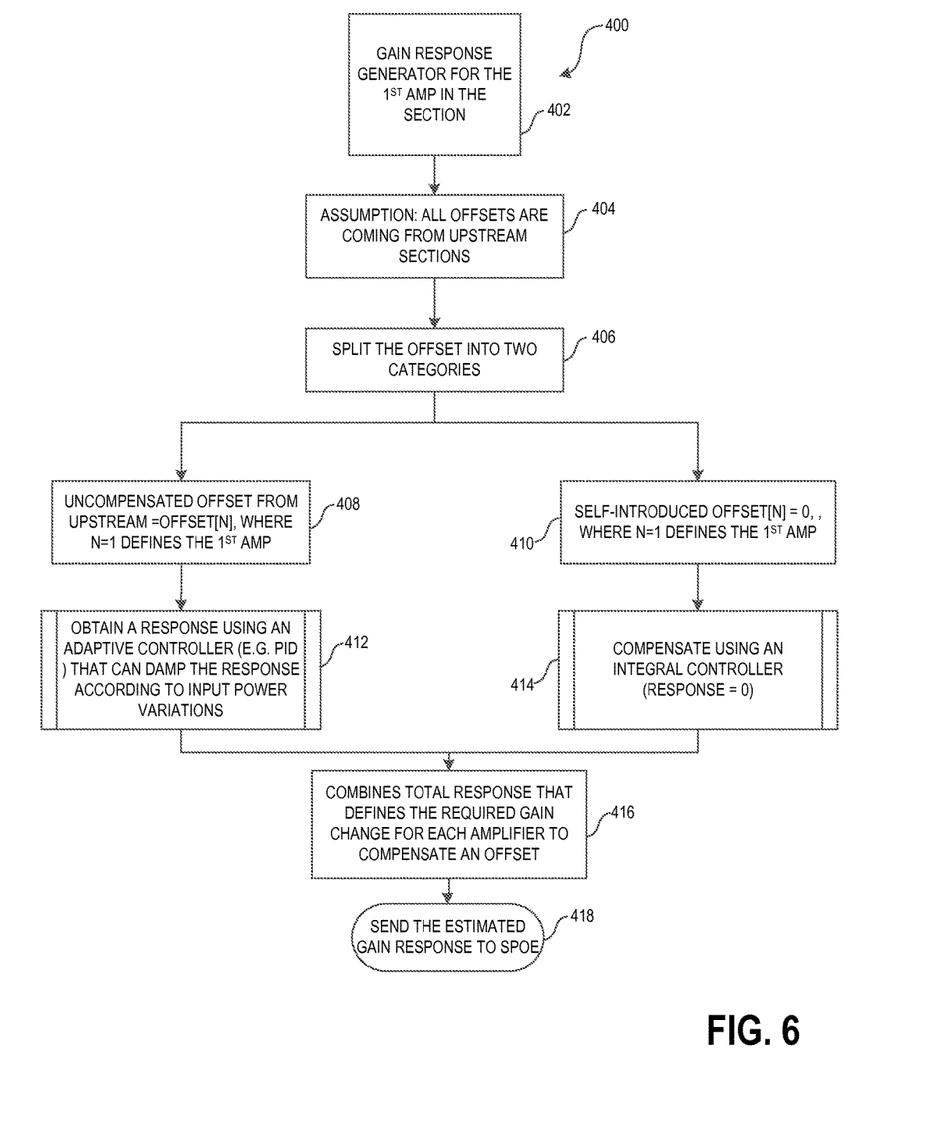
FIG. 6 is a flowchart of a gain response generator used by the SPOE process in FIG. 5 for the first optical amplifier in the optical section.
Figure 7:
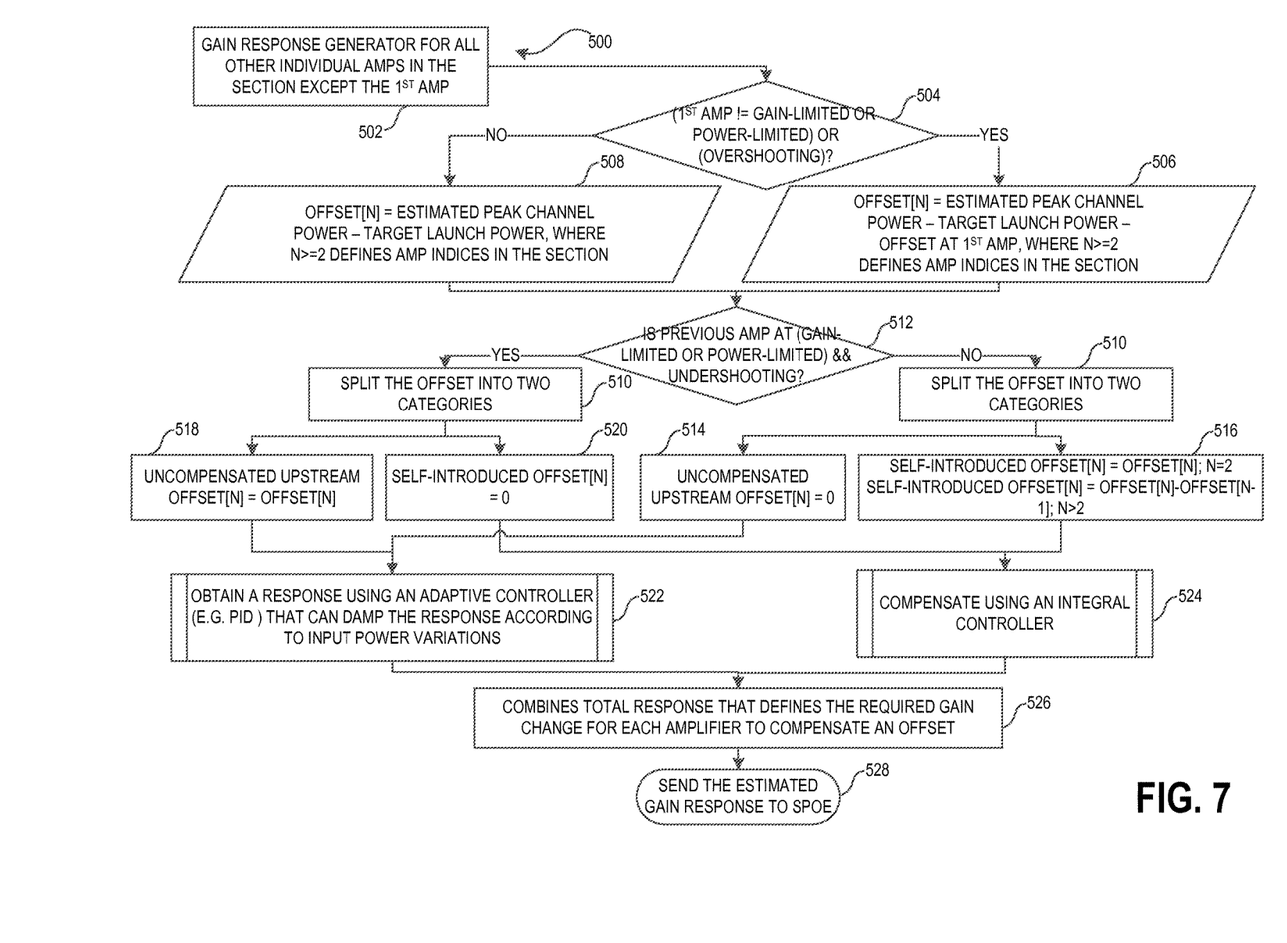
FIG. 7 is a flowchart of a gain response generator used by the SPOE process in FIG. 5 for all other optical amplifiers besides the first optical amplifier in the optical section.

Referring to FIGS. 6 and 7, in an exemplary embodiment, flowcharts illustrate a gain response generator 400 for the first optical amplifier 30 in the optical section 12 and a gain response generator 500 for all other optical amplifiers 32, 34 in the optical section 12. The gain response generators 400, 500 are used by the SPOE process 300. In FIG. 6, the gain response generator 400 is used in step 312 of the SPOE process 300 as the gain response generator for the first optical amplifier 30 in the optical section 12 (step 402). Again, an important aspect of the systems and methods described herein is all offsets at the first optical amplifier 30 are assumed to come from upstream sections 12 (step 404). This assumption allows the SPOE process 300 to operate without coordination or messaging with the upstream sections 12. The offset is split into two categories or components (step 406)—uncompensated offset from upstream, offset[n] where n=1 for the first optical amplifier 30 (step 408) and self-introduced offset[n], which is set to 0 for n=1 for the first optical amplifier 30 (step 410).

For the uncompensated offset from upstream, the gain response generator 400 includes obtaining a response using an adaptive controller (e.g., a proportional-integral-derivative (PID) controller) that can damp the response according to input power variations (step 412). For the self-introduced offset, the compensation is used an integral controller, with the response=0 (step 414). The gain response generator 400 combines the total response, from steps 412, 414, that defines the required gain change for each optical amplifier to compensate the offset (step 416) and sends this estimated gain response to the SPOE process 300 (step 418).

As described in FIG. 6, if this is the first optical amplifier 30 in the optical section 12, one key assumption is that the first optical amplifier 30 in the optical section 12 introduces almost zero or negligible amount of additional offset into the spectrum other than the usual gain ripples. That means, any offset observed at the output of the optical amplifier 30 in the optical section 12, the systems and methods described herein assume that the offset is coming from the faults or offset introduced in the upstream sections 12, and obtains a much damped response using an adaptive PID controller that can re-adjust its response in follow-up iterations based on input power variations or checking the derivatives between expected output powers in the past iterations.

In FIG. 7, the gain response generator 500 is used in step 314 of the SPOE process 300 as the gain response generator for all other individual optical amplifiers 32, 34 in the optical section 12 except the first optical amplifier 30 (step 502). Here, the first optical amplifier 30 is checked for available dynamic range (i.e. not at max gain, and not power-limited) or overshooting (step 504). If so (step 504), the offset for all other optical amplifiers 32, 34 is estimated after subtracting the offset visible in the first optical amplifier 30 based on the assumption that as long as the first optical amplifier 30 has some dynamic range available, it will take care of the peak channel offset, specifically the offset estimated for all other optical amplifiers 32, 34=Estimated peak channel power–Target launch power for peak channel–offset in the first optical amplifier 30 (step 506).

If the first optical amplifier 30 is out of dynamic gain range and undershooting (step 504), then the next optical amplifier 32 becomes ready to compensate for the offset coming from upstream. In such case, the offset estimated at all other optical amplifiers 32, 34=Estimated peak channel power–Target launch power for peak channel (step 508). Once the offset is properly estimated, the offset is split that into two major categories or components (step 510)—the uncompensated upstream offset and the self-introduced offset. If the previous optical amplifier has either available dynamic gain range or overshooting (step 512), the downstream optical amplifier within the optical section 12 does not compensate for any upstream offset (step 514). Since, the offset estimated for the previous optical amplifier represents the cumulative offset from all offsets introduced by all upstream optical amplifiers, that value is subtracted to obtain how much offset is introduced by the optical amplifier itself (step 516), as follows:

Uncompensated upstream offset for $AMP_{n>1}=0$

Self introduced offset for $AMP_{n<1}$=Offset at $AMP_n$−Offset at $AMP_{n-1}$

Otherwise (step 512), if the previous optical amplifier is at maximum gain and undershooting, the downstream optical amplifier assumes that all offset visible on that optical amplifier is coming from upstream (step 518), and any self-introduced content is zero (step 520), as follows:

Uncompensated upstream offset for $AMP_{n<1}$=Offset at $AMP_{n<1}$

Self introduced offset for $AMP_{n<1}=0$.

Once the offset contents are split (steps 514-520), a damped adaptive PID controller is used, similar to the first optical amplifier 30, to obtain response for uncompensated upstream offset contents (step 522), and regular integral controller is used for the self-introduced offset contents (step 524) to generate a combined response for each optical amplifier (step 526), which is provided to the SPOE process 300 (step 528). In the case, where previous optical amplifier has enough dynamic range, instead of setting the uncompensated upstream offset parameter to zero (0) as mentioned above, it should be possible to make the loop more aggressive to estimate exactly how much offset will be left uncompensated by the upstream optical amplifier after exhausting its dynamic range, which then can be compensated by the downstream optical amplifier at the same iteration as the upstream optical amplifier, namely:

Uncompensated upstream offset for $AMP_{n<1}$=Dynamic Gain $Range_{n-1}$−$offset_{n-1}$ Such action may generate some perturbations over the optical spectrum, and hence, coefficients for the PID controller are chosen carefully to keep a stable optical spectrum end to end.

The systems and methods described herein primarily address stability issues between multiple optically dependent sections 12 facing recovery from line faults or from minimizing PSD offsets on in-service channels, by allowing each section to independently eliminate their own offsets or recover from line faults or allowing each optical amplifier the capability to minimize its own PSD offsets. With the systems and methods in place, the sectional controller 14 has the capability to operate in a peer-to-peer message free environment allowing the possibility of developing independent OADM sectional controllers. Also, the systems and methods allow OADMs even with no or limited per channel actuator capabilities to maintain stability over the spectrum, where per channel actuation can be done from further upstream.

Figure 8:
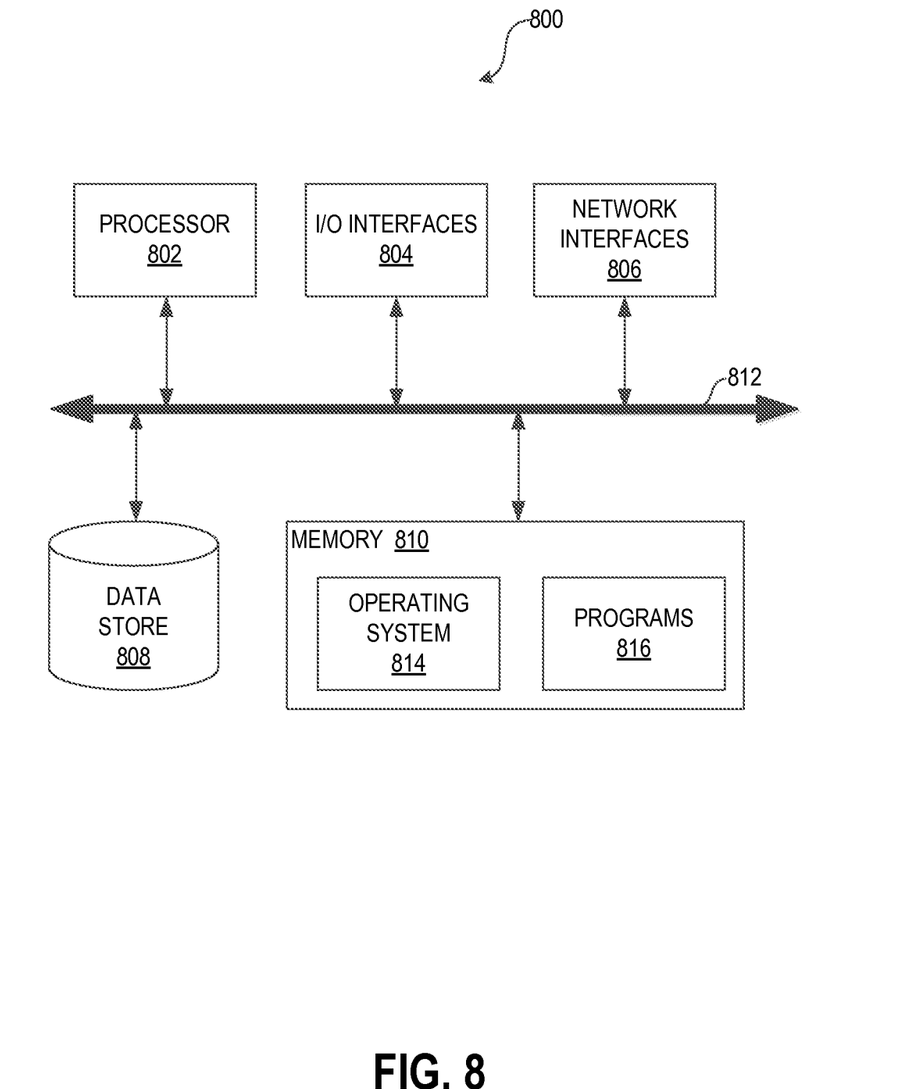
FIG. 8 is a block diagram of an exemplary implementation of a controller.

Referring to FIG. 8, in an exemplary embodiment, a block diagram illustrates an exemplary implementation of a controller 800. The controller 800 provides an exemplary implementation of the sectional controller 14, which in turn can include the per channel controller 54, the spectrum controller 56, and the AGC controllers 58. In another exemplary embodiment, the controller 800 can be an exemplary implementation of the spectrum controller 56 which in turn can include the AGC controllers 58. The controller 800 can be located at the multiplexer 16, the demultiplexer 22, or the optical amplifiers 30, 32, 34. The controller 800 can be a digital processing device that, in terms of hardware architecture, generally includes a processor 802, input/output (I/O) interfaces 804, a network interface 806, a data store 808, and memory 810. It should be appreciated by those of ordinary skill in the art that FIG. 8 depicts the controller 800 in an oversimplified manner, and a practical embodiment may include additional components and suitably configured processing logic to support known or conventional operating features that are not described in detail herein. The components (802, 804, 806, 808, and 810) are communicatively coupled via a local interface 812. The local interface 812 can be, for example, but not limited to, one or more buses or other wired or wireless connections, as is known in the art. The local interface 812 can have additional elements, which are omitted for simplicity, such as controllers, buffers (caches), drivers, repeaters, and receivers, among many others, to enable communications. Further, the local interface 812 can include address, control, and/or data connections to enable appropriate communications among the aforementioned components.

The processor 802 is a hardware device for executing software instructions. The processor 802 can be any custom made or commercially available processor, a central processing unit (CPU), an auxiliary processor among several processors associated with the controller 800, a semiconductor-based microprocessor (in the form of a microchip or chip set), or generally any device for executing software instructions. When the controller 800 is in operation, the processor 802 is configured to execute software stored within the memory 810, to communicate data to and from the memory 810, and to generally control operations of the controller 800 pursuant to the software instructions. The I/O interfaces 804 can be used to receive user input from and/or for providing system output to one or more devices or components. The network interface 806 can be used to enable the controller 800 to communicate on a network. For example, the I/O interfaces 804 and/or the network interface 806 can communicatively couple the controller 800 to the various monitoring points, the OSMs 46, 50, the optical amplifiers 30, 32, 34, etc.

The data store 808 can be used to store data. The data store 808 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 808 can incorporate electronic, magnetic, optical, and/or other types of storage media. The memory 810 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 810 can incorporate electronic, magnetic, optical, and/or other types of storage media. Note that the memory 810 can have a distributed architecture, where various components are situated remotely from one another, but can be accessed by the processor 802. The software in memory 810 can include one or more software programs, each of which includes an ordered listing of executable instructions for implementing logical functions. The software in the memory 810 includes a suitable operating system (O/S) 814 and one or more programs 816. The operating system 814 essentially controls the execution of other computer programs, such as the one or more programs 816, and provides scheduling, input-output control, file and data management, memory management, and communication control and related services. The one or more programs 816 may be configured to implement the various processes, algorithms, methods, techniques, etc. described herein for SPOE.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A spectrum control method for minimizing power spectral density (PSD) offsets by adjusting gain of optical amplifiers in an optical section, wherein the optical section comprises a logical boundary from one optical signal access point to a next adjacent optical signal access point, the method comprising:
estimating PSD offset from a given target for a peak channel at each span in the optical section, wherein the estimated PSD offset is divided at each span into two components comprising a self-introduced offset and an uncompensated offset from upstream;
generating, for each span, a separate controller response for the self-introduced offset and the uncompensated offset from upstream; and
controlling the gain of the optical amplifiers based on the separate controller response for the self-introduced offset and the uncompensated offset from upstream, for each span.

2. The method of claim 1, wherein the method is performed in a controller for the optical section without peer-to-peer messaging with any other controllers from other optical sections, regardless of optical dependencies between the controller and the other controllers.

3. The method of claim 1, wherein the method is implemented autonomously from other optical sections based on all PSD offsets at a first monitoring point in the optical section treated as uncompensated offset from upstream, thereby eliminating any need for messaging between controllers.

4. The method of claim 1, wherein a first optical amplifier in the optical section is assigned zero self-introduced offset, and is configured to solely compensate the uncompensated offset from upstream using an adaptive controller that damps responses according to input power variations, thereby allowing upstream controllers an opportunity to correct the uncompensated offset from upstream.

5. The method of claim 1, wherein the spectrum control method is implemented in a spectrum controller that operates a plurality of Automatic Gain Controlled (AGC) controllers for each optical amplifier in the optical section, wherein each of the AGC controllers knows the estimated PSD offset and dynamic range of an immediate upstream AGC controller in the optical section.

6. The method of claim 5, wherein a first AGC in the optical section of the plurality of AGCs treats all PSD offsets as coming from upstream.

7. The method of claim 1, wherein the separate controller generates a proportionate response to compensate for the self-introduced offset, and an adaptive proportionate response to compensate for the uncompensated offset from upstream that is dynamically readjusted based on unexpected output power variations.

8. The method of claim 1, wherein, for all optical amplifiers except a first optical amplifier in the optical section, the separate controller does not compensate for the uncompensated offset from upstream as long as an immediate upstream optical amplifier in the optical section has enough dynamic range to compensate for the uncompensated offset from upstream.

9. The method of claim 1, wherein the PSD offset is estimated for each span through one or more monitoring points in the optical section.

10. The method of claim 1, wherein the PSD offset is a difference between an estimated channel power for a peak channel and a target launch power for the peak channel, and each optical amplifier in the optical section has an associated PSD offset.

11. The method of claim 1, wherein, for all optical amplifiers except a first optical amplifier in the optical section, a magnitude of the power spectral density offset for which, each controller compensates, is one of
an estimated channel power for a peak channel minus a target launch power for the peak channel minus the PSD offset from the first optical amplifier if the first optical amplifier has dynamic range left, or
an estimated channel power for a peak channel minus a target launch power for the peak channel if the first optical amplifier does not have dynamic range left.

12. The method of claim 1, wherein, for an optical amplifier that is not a first optical amplifier in the optical section, the two components are determined by
if a previous optical amplifier has available dynamic range or overshooting, the uncompensated offset from upstream is set to zero and the self-introduced offset is a difference of the PSD offset from the optical amplifier and the PSD offset from the previous optical amplifier, or
else, the uncompensated offset from upstream is set to the estimated PSD offset, and the self-introduced offset is set to zero.

13. A controller configured to minimize power spectral density (PSD) offsets through gain adjustments in optical amplifiers in an optical section, wherein the optical section comprises a logical boundary from one optical signal access point to a next adjacent optical signal access point, the controller comprising:
- an interface communicatively coupled to elements in the optical section, the interface configured to receive measurements from the elements;
- a processor communicatively coupled to the interface; and
- memory storing instructions that, when executed, cause the processor to
    - estimate PSD offset from a given target for a peak channel at each span in the optical section based on the measurements, wherein the estimated PSD offset is divided at each span into two components comprising a self-introduced offset and an uncompensated offset from upstream,
    - generate, for each span, a separate controller response for the self-introduced offset and the uncompensated offset from upstream, and
    - control the gain of the optical amplifiers based on the separate controller response for the self-introduced offset and the uncompensated offset from upstream, for each span.

14. The controller of claim 13, wherein the controller does not perform peer-to-peer messaging with any other controllers from other optical sections in operation, regardless of optical dependencies between the controller and the other controllers.

15. The controller of claim 13, wherein the controller operates autonomously from other optical sections based on all estimated PSD offsets at a first monitoring point in the optical section is uncompensated offset from upstream, thereby eliminating any need for messaging between controllers.

16. The controller of claim 13, wherein a first optical amplifier in the optical section is assigned zero self-introduced offset, and is configured to solely compensate the uncompensated offset from upstream using an adaptive controller that damps responses according to input power variations, thereby allowing upstream controllers an opportunity to correct the uncompensated offset from upstream.

17. The controller of claim 13, wherein the controller is a spectrum controller that operates a plurality of Automatic Gain Controlled (AGC) controllers for each optical amplifier in the optical section, wherein each of the AGC controllers knows the estimated PSD offset and dynamic range of an immediate upstream AGC controller in the optical section.

18. The controller of claim 13, wherein the separate controller generates a proportionate response to compensate for the self-introduced offset, and an adaptive proportionate response to compensate for the uncompensated offset from upstream that is dynamically readjusted based on unexpected output variations.

19. The controller of claim 13, wherein, for all optical amplifiers except a first optical amplifier in the optical section, the separate controller does not compensate for the uncompensated offset from upstream as long as an immediate upstream optical amplifier in the optical section has enough dynamic range to compensate for the uncompensated offset from upstream.

20. An optical network, comprising:
- N optical sections each comprising a logical boundary from one optical signal access point to a next adjacent optical signal access point, N is an integer greater than 1;
- one or more optical amplifiers in each of the N optical sections; and
- N sectional controllers configured to minimize power spectral density (PSD) offsets based on controlling gain of the one or more optical amplifiers in an associated optical section;
- wherein the N sectional controllers are configured to minimize the PSD offsets without peer-to-peer messaging between one another based on all PSD offsets at a first monitoring point in the associated optical section treated as upstream PSD offsets, and an associated response to the upstream PSD offsets is dampened to allow upstream sectional controllers an opportunity to control.

* * * * *